(12) United States Patent
Lane

(10) Patent No.: US 6,558,035 B2
(45) Date of Patent: May 6, 2003

(54) ELECTRIC WHISK

(75) Inventor: Gary Arron Lane, London (GB)

(73) Assignee: Aerolatte Limited (GB)

( * ) Notice: Subject to any disclaimer, the term of this patent is extended or adjusted under 35 U.S.C. 154(b) by 0 days.

(21) Appl. No.: 09/945,942

(22) Filed: Sep. 4, 2001

(65) Prior Publication Data

US 2002/0075752 A1 Jun. 20, 2002

Related U.S. Application Data

(63) Continuation-in-part of application No. 29/138,538, filed on Mar. 15, 2001, now Pat. No. Des. 452,111.

(30) Foreign Application Priority Data

Sep. 4, 2000 (GB) .............................. 0021672

(51) Int. Cl.⁷ ................................................ B01F 7/00
(52) U.S. Cl. ................................................... 366/129
(58) Field of Search .......................... 366/129; D7/379, D7/376; 320/114; 15/22.1

(56) References Cited

U.S. PATENT DOCUMENTS

| | | | |
|---|---|---|---|
| D121,299 S | | 7/1940 | Krebs |
| 3,117,769 A | | 1/1964 | Spingler |
| 3,274,631 A | * | 9/1966 | Spohr .......................... 15/22.1 |
| 3,525,919 A | * | 8/1970 | Wise ........................... 320/114 |
| 4,575,255 A | * | 3/1986 | Kafka .......................... 366/129 |
| D313,533 S | | 1/1991 | Rixen |
| D327,603 S | * | 7/1992 | van Asten ..................... D7/376 |
| D371,044 S | | 6/1996 | Bourassa |
| 5,689,850 A | * | 11/1997 | Shekalim ..................... 15/22.1 |
| D421,872 S | * | 3/2000 | Wong .......................... D7/376 |
| D452,111 S | * | 12/2001 | Lane ........................... D7/376 |

* cited by examiner

Primary Examiner—Tony G. Soohoo
(74) Attorney, Agent, or Firm—Craig A. Fieschko, Esq.; DeWitt Ross & Stevens S.C.

(57) ABSTRACT

An electric whisk is provided having an electric battery compartment (2) and a closure (40) for the compartment, with means (8) to ensure that the closure cannot be deployed to close the compartment without providing an electrical connection. In alternative aspects, the whisk includes a guard (20) to at least partially prevent liquid from entering the whisk housing (1) at the place at which the whisk axle (11) emerges from the housing. A method is also provided to electroplate the whisk housing whilst protecting the electric motor (10) from the electrolyte.

16 Claims, 3 Drawing Sheets

ELECTRIC WHISK

CROSS-REFERENCE TO RELATED APPLICATIONS

This application is a continuation-in-part of U.S. Design Pat. Application 29/138,538 filed Mar. 15, 2001, now U.S. Pat. No. Des. 452,111 which is incorporated by reference herein.

FIELD OF THE INVENTION

This disclosure concerns an invention relating generally to an electric whisk, and in particular to an electric whisk which is suitable for frothing milk for use in speciality coffees such as cappuccino and caffe latte, and also for preparing milk shakes and protein or slimming drinks.

BACKGROUND OF THE INVENTION

The increase in foreign travel, both for holidays and business trips, and the rise in the number of speciality coffee bars, has resulted in an increasing popularity in speciality coffees such as cappuccino and caffe latte. Both of these types of coffees require frothed milk, and this is achieved in cafes and restaurants and the like by injecting steam into milk at high pressure.

It would be desirable for the consumer to be able to produce cappuccino and caffe latte at home, but industrial milk frothing machines are expensive and domestic machines are generally inadequate. Various "instant" powdered formulations have been developed, but these are inauthentic and unsatisfactory for those used to the real thing.

SUMMARY OF THE INVENTION

The invention involves an electric whisk which is intended to at least partially solve the aforementioned problems. To give the reader a basic understanding of some of the advantageous features of the invention, following is a brief summary of preferred versions of the electric whisk. As this is merely a summary, it should be understood that more details regarding the preferred versions may be found in the Detailed Description set forth elsewhere in this document. The claims set forth at the end of this document then define the various versions of the invention in which exclusive rights are secured.

In a first preferred version of the invention, there is provided an electric whisk, comprising a housing, an electric motor housed therein, an axle connected to the motor and a whisk head connected to the axle at the distal end to the motor, the housing having a compartment for at least two batteries to drive the motor and a sliding closure for said compartment, the closure having a conducting element on the face of the closure proximate the batteries for providing electrical connection between the batteries when said compartment is closed, and the housing having at least one runner in which the closure can slide to close said compartment, the runner being spaced apart from the batteries so that the conducting element connects the batteries electrically when the closure is seated in the runner and said compartment is closed, wherein the housing has means to ensure that the closure cannot be deployed to close the compartment without providing said electrical connection. Preferably, said means comprises at least one abutment surface on the side of the runner opposite said compartment. It is particularly preferred that said abutment surface be provided by a bar connecting the wall of the runner distal the battery compartment to the wall of the housing.

In similar fashion, the invention may be provided by an electric whisk comprising a housing, an electric motor housed therein, an axle connected to the motor and a whisk head connected to the axle at the distal end to the motor, the housing having a compartment for a battery to drive the motor and a closure for said compartment, wherein the whisk includes a guard to at least partially prevent liquid from entering the housing at the place at which the axle emerges from the housing. The provision of the guard reduces the likelihood of milk running down the axle and into the housing, thereby damaging the internal workings of the whisk. In a preferred embodiment, said guard is a collar fitted around the axle at the point at which the axle emerges from the housing.

The invention may also encompass a method for electroplating an electric housing having an electric motor housed therein, comprising the step of surrounding the motor with an insulating material prior to the step of electroplating the housing, whereby the insulating material protects the motor from the electrolyte. Said insulating material preferably comprises wax and may be in the form of an insulating paint. Thus, an electric whisk in accordance with the invention may comprise a housing and an electric motor housed therein, wherein the housing has been electroplated by means of the foregoing method.

Further advantages, features, and objects of the invention will be apparent from the following detailed description of the invention in conjunction with the associated drawings.

BRIEF DESCRIPTION OF THE DRAWINGS

A preferred embodiment of the invention will now be described with reference to the drawings, in which.

DETAILED DESCRIPTION OF PREFERRED EMBODIMENTS OF THE INVENTION

Figure 1:
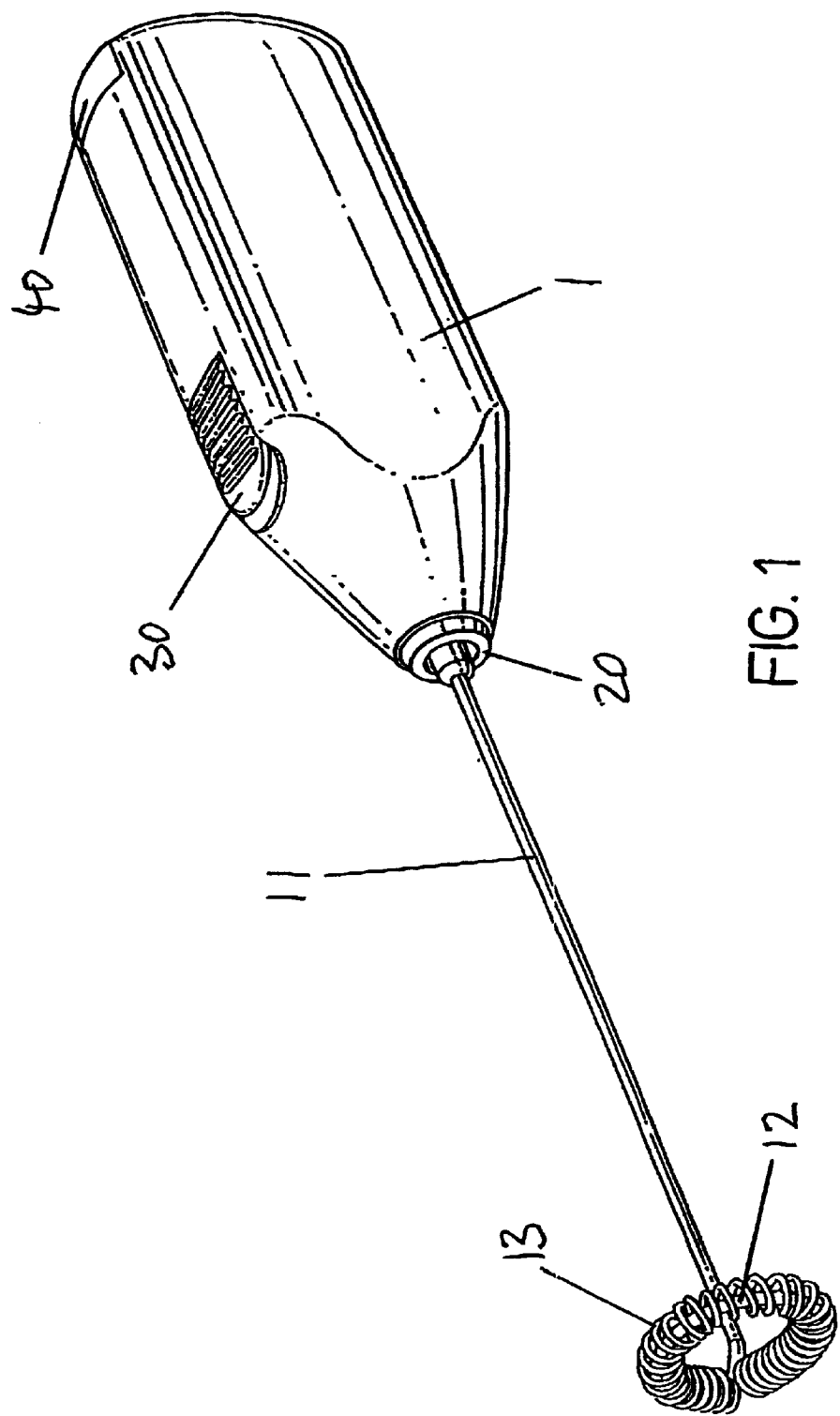
FIG. 1 shows a perspective view of a whisk in accordance with the invention.
Figure 2:
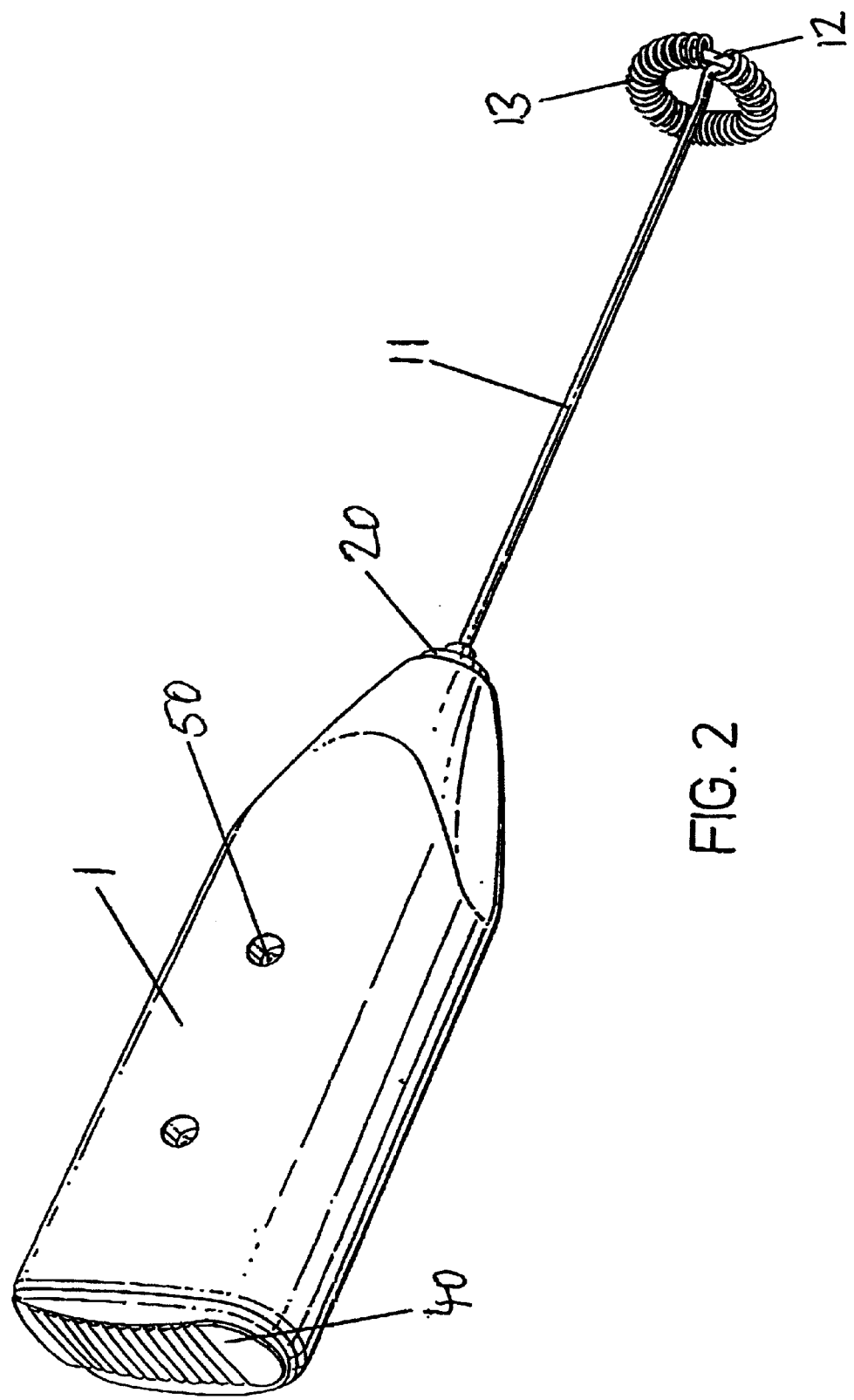
FIG. 2 shows an alternative perspective view of the whisk of FIG. 1.
Figure 3:
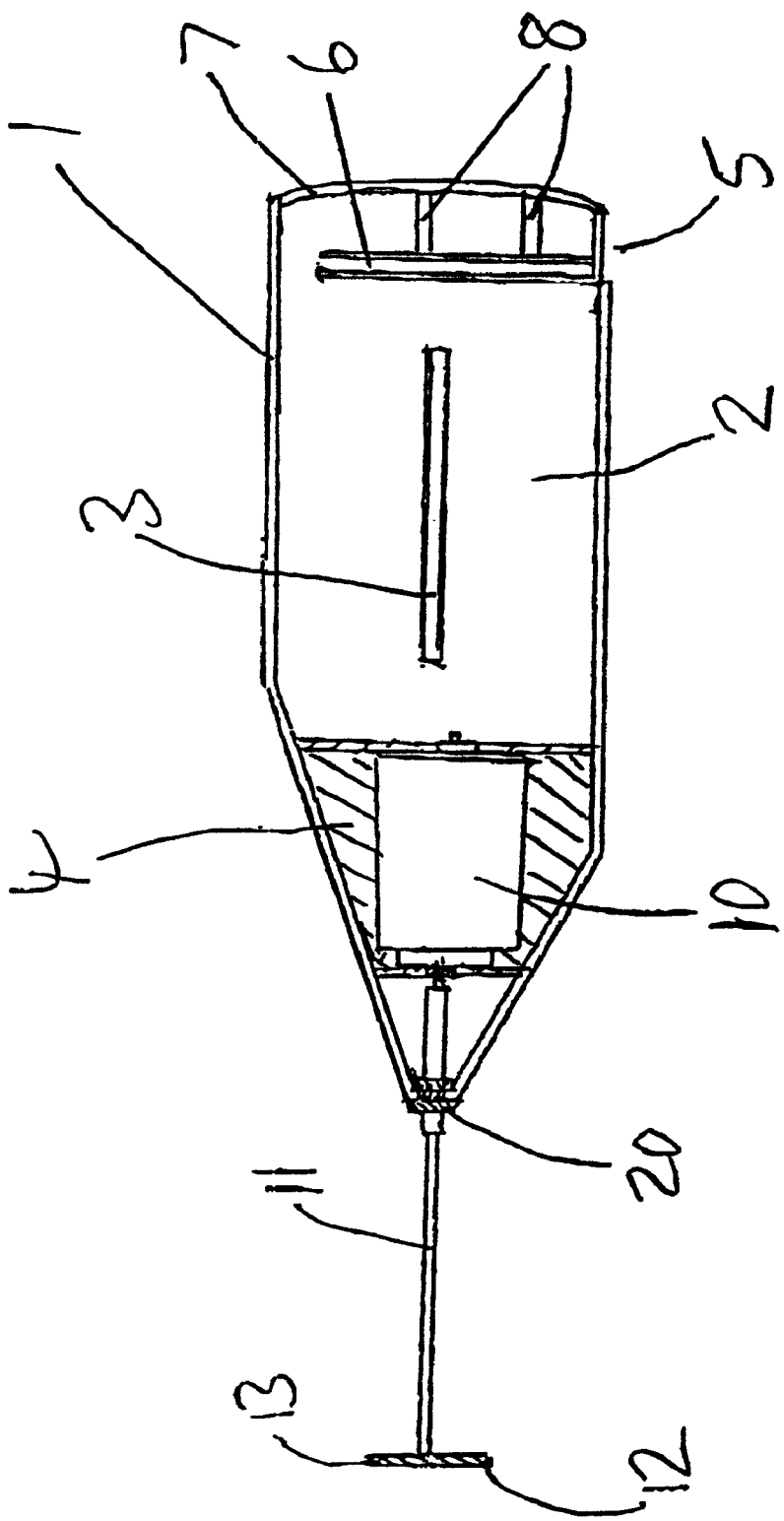
FIG. 3 is a cutaway section of the whisk of FIGS. 1 and 2 to show the internal workings of the whisk.

Referring to FIGS. 1 to 3, the whisk comprises a housing 1 having a compartment 2 for two batteries of the "AA" type, the two batteries being separated in compartment 2 by dividing wall 3. Housing 1 also has a motor compartment 4 for housing motor 10. Motor compartment 4 is formed from a plastics material molded to match the internal surface of housing 1 in order to insulate motor 10 from the other components of the whisk. The two halves of housing 1 are held together by stainless steel screws (not shown) in screw holes 50.

Axle 11 is connected at one end to motor 10 and has a whisk head at the other end. The whisk head is formed by bending an extension of axle 11 into an annulus 12 around axle 11, annulus 12 having wire coil 13 wound around it to provide the whisking action.

Plastic collar 20 surrounds axle 11 at the point which it enters housing 1. Projections from the neck of housing 1 are seated in a groove in collar 20 to secure collar 20 in housing 1.

The end of housing 1 distal from the whisk head has cut-out 5 and runner 6 for receiving closure 40. Ridges on either side of closure 40 (not shown) engage with runner 6 (and a corresponding runner on the other half of housing 1—not shown) and slide along runner 6 to close battery compartment 2. Bars 8 are formed in housing 1 between runner 6 and housing wall 7, and bars 8 provide an abutment surface for the ridges of closure 40 to prevent closure 40 from being slid above runner 6 to close compartment 2. This means that the only way in which closure 40 can be deployed is by sliding it along runner 6, which means that the conducting strip on the underside of the closure 40 (not shown) always contacts the ends of the batteries in battery compartment 2, thereby making the connection between the batteries.

Switch 30 in the side of housing 1 operates in a conventional sense to make an electrical connection between the batteries and motor 10, thereby driving axle 11 and the whisk head in order to froth the user's milk.

The invention is not intended to be limited to the preferred embodiments described above, but rather is intended to be limited only by the claims set out below. Thus, the invention encompasses all alternate embodiments that fall literally or equivalently within the scope of these claims.

What is claimed is:

1. An electric whisk comprising:
   a. a housing,
   b. an electric motor housed therein,
   c. an axle connected to the motor, the axle having a whisk head thereon,
   the housing having a compartment for at least two batteries to drive the motor and a sliding closure for said compartment,
   the closure having a conducting element on the face of the closure proximate the batteries for providing electrical connection between the batteries when said compartment is closed,
   and the housing having at least one runner in which the closure can slide to close said compartment, the runner being spaced apart from the batteries so that the conducting element connects the batteries electrically when the closure is seated in the runner and said compartment is closed,
   wherein the housing has means to ensure that the closure cannot be deployed to close the compartment without providing said electrical connection.

2. A whisk as claimed in claim 1 wherein said means comprises at least one abutment surface on the side of the runner opposite said compartment.

3. A whisk as claimed in claim 2 wherein said abutment surface is provided by a bar connecting the wall of the runner distal the battery compartment to the wall of the housing.

4. A whisk as claimed in claim 1 wherein the whisk head is defined by a coil wound about the axle.

5. A whisk as claimed in claim 4 wherein the portion of the axle about which the coil is wound extends about a path which at least partially encircles another portion of the axle.

6. A whisk as claimed in claim 1 wherein wax electrically insulates the motor from the housing.

7. A whisk as claimed in claim 1 wherein a coat of paint electrically insulates the motor from the housing.

8. A whisk as claimed in claim 1 further comprising a guard to at least partially prevent liquid from entering the housing at the place at which the axle emerges from the housing.

9. A whisk as claimed in claim 8 wherein said guard is a collar fitted around the axle as the axle emerges from the housing.

10. An electric whisk comprising:
    a. a housing,
    b. an electric motor housed therein,
    c. an axle connected to the motor, the axle having a whisk head thereon,
    d. the housing having a compartment for a battery to drive the motor and a closure for said compartment,
    wherein the whisk includes a guard to at least partially prevent liquid from entering the housing at the place at which the axle emerges from the housing.

11. A whisk as claimed in claim 10 wherein said guard is a collar fitted around the axle as the axle emerges from the housing.

12. A whisk as claimed in claim 10 wherein the motor is electrically insulated from the housing by wax.

13. A whisk as claimed in claim 10 wherein a coat of paint electrically insulates the motor from the housing.

14. A whisk as claimed in claim 10 wherein:
    the compartment accommodates at least two batteries,
    the closure has a conducting element on the face of the closure proximate the batteries for providing electrical connection between the batteries when said compartment is closed,
    the housing having at least one runner in which the closure can slide to close said compartment, the runner being spaced apart from the batteries so that the conducting element connects the batteries electrically when the closure is seated in the runner and said compartment is closed,
    wherein the housing has means to ensure that the closure cannot be deployed to close the compartment without providing said electrical connection.

15. A whisk as claimed in claim 14 wherein said means comprises at least one abutment surface on the side of the runner opposite said compartment.

16. A whisk as claimed in claim 15 wherein said abutment surface is provided by a bar connecting the wall of the runner distal the battery compartment to the wall of the housing.

* * * * *